US006367423B1

(12) United States Patent
Scheuer

(10) Patent No.: US 6,367,423 B1
(45) Date of Patent: Apr. 9, 2002

(54) DEVICE FOR PROTECTING FURNITURE FROM PET DAMAGE

(76) Inventor: Barbara Scheuer, 35 Heritage La., Building G, Hamburg, NJ (US) 07419

( * ) Notice: Subject to any disclaimer, the term of this patent is extended or adjusted under 35 U.S.C. 154(b) by 0 days.

(21) Appl. No.: 09/610,122

(22) Filed: Jun. 30, 2000

(51) Int. Cl.[7] .............................................. A01K 15/02
(52) U.S. Cl. .................................... 119/706; 297/219.1
(58) Field of Search ........................... 297/219.1, 218.1, 297/218.2, 184.1; 5/426, 512, 663; 119/706; 256/73; 403/DIG. 1

(56) References Cited

U.S. PATENT DOCUMENTS

| 3,085,551 | A | | 4/1963 | Helmer | |
|---|---|---|---|---|---|
| 3,591,212 | A | * | 7/1971 | Rhyne | 287/20.92 |
| 3,695,690 | A | * | 10/1972 | Carson | 297/218 |
| 3,936,025 | A | | 2/1976 | Cass | |
| 5,048,130 | A | * | 9/1991 | Brotman et al. | 4/483 |
| 5,161,484 | A | | 11/1992 | Duane | |
| D336,033 | S | | 6/1993 | Welsh | |
| 5,357,728 | A | * | 10/1994 | Duncanson | 52/592.4 |
| 5,592,901 | A | | 1/1997 | Birmingham | |
| 5,619,953 | A | | 4/1997 | Griffin | |

FOREIGN PATENT DOCUMENTS

| DE | 2615447 A1 | * | 10/1977 |
|---|---|---|---|
| DE | 3818825 A1 | * | 2/1989 |

* cited by examiner

Primary Examiner—Michael J. Carone
Assistant Examiner—Floris C Copier

(57) ABSTRACT

A device for protecting furniture from pet damage for preventing pets from chewing on covered areas of the furniture covered by the panels of the invention. The device for protecting furniture from pet damage includes a plurality of protective panels comprising side edges, end edges, faces and a connector system; and an anchoring panel comprising an anchor edge and T-shaped protrusions.

17 Claims, 3 Drawing Sheets

DEVICE FOR PROTECTING FURNITURE FROM PET DAMAGE

BACKGROUND OF THE INVENTION

1. Field of the Invention

The present invention relates to furniture protection devices and more particularly pertains to a new device for protecting furniture from pet damage for preventing pets from chewing on covered areas of the furniture covered by the panels of the invention.

2. Description of the Prior Art

The use of furniture protection devices is known in the prior art. More specifically, furniture protection devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,592,901; U.S. Pat. No. Des. 336,033; U.S. Pat. Nos. 3,085,551; 5,161,484; 5,619,953; 3,936,025.

While these devices fulfill their respective, particular objectives and requirements, the aforementioned patents do not disclose a new device for protecting furniture from pet damage. The inventive device includes a plurality of protective panels comprising side edges, end edges, faces and a connector system; and an anchoring panel comprising an anchor edge and T-shaped protrusions.

In these respects, the device for protecting furniture from pet damage according to the present invention substantially departs from the conventional concepts and designs of the prior art, and in so doing provides an apparatus primarily developed for the purpose of preventing pets from chewing on covered areas of the furniture covered by the panels of the invention.

SUMMARY OF THE INVENTION

In view of the foregoing disadvantages inherent in the known types of furniture protection devices now present in the prior art, the present invention provides a new device for protecting furniture from pet damage construction wherein the same can be utilized for preventing pets from chewing on covered areas of the furniture covered by the panels of the invention.

The general purpose of the present invention, which will be described subsequently in greater detail, is to provide a new device for protecting furniture from pet damage apparatus and method which has many of the advantages of the furniture protection devices mentioned heretofore and many novel features that result in a new Device for protecting furniture from pet damage which is not anticipated, rendered obvious, suggested, or even implied by any of the prior art furniture protection devices, either alone or in any combination thereof.

To attain this, the present invention generally comprises a plurality of protective panels comprising side edges, end edges, faces and a connector system; and an anchoring panel comprising an anchor edge and T-shaped protrusions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for protecting furniture from pet damage apparatus and method which has many of the advantages of the furniture protection devices mentioned heretofore and many novel features that result in a new device for protecting furniture from pet damage which is not anticipated, rendered obvious, suggested, or even implied by any of the prior art furniture protection devices, either alone or in any combination thereof.

It is another object of the present invention to provide a new device for protecting furniture from pet damage which may be easily and efficiently manufactured and marketed.

It is a further object of the present invention to provide a new device for protecting furniture from pet damage which is of a durable and reliable construction.

An even further object of the present invention is to provide a new device for protecting furniture from pet damage which is susceptible of a low cost of manufacture with regard to both materials and labor, and which accordingly is then susceptible of low prices of sale to the consuming public, thereby making such device for protecting furniture from pet damage economically available to the buying public.

Still yet another object of the present invention is to provide a new device for protecting furniture from pet damage which provides in the apparatuses and methods of the prior art some of the advantages thereof, while simultaneously overcoming some of the disadvantages normally associated therewith.

Still another object of the present invention is to provide a new device for protecting furniture from pet damage for preventing pets from chewing on covered areas of the furniture covered by the panels of the invention.

Yet another object of the present invention is to provide a new device for protecting furniture from pet damage which includes a plurality of protective panels comprising side edges, end edges, faces and a connector system; and an anchoring panel comprising an anchor edge and T-shaped protrusions.

Still yet another object of the present invention is to provide a new device for protecting furniture from pet damage that provides protective panels that are easily coupled to and removed from furniture without requiring any modifications or damage to the furniture.

Even still another object of the present invention is to provide a new device for protecting furniture from pet damage that provides protective panels that are easily configured for different furniture sizes and shapes, and easily collapsed into a relatively, flat compact form for transport and storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
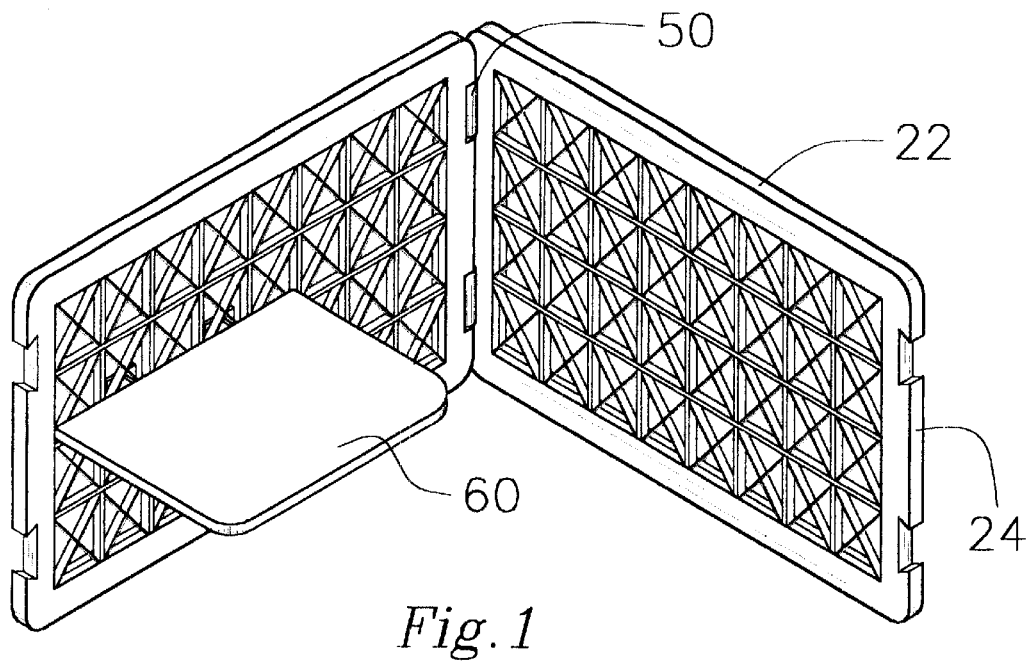
FIG. 1 is a perspective schematic view of the present invention.
Figure 2:
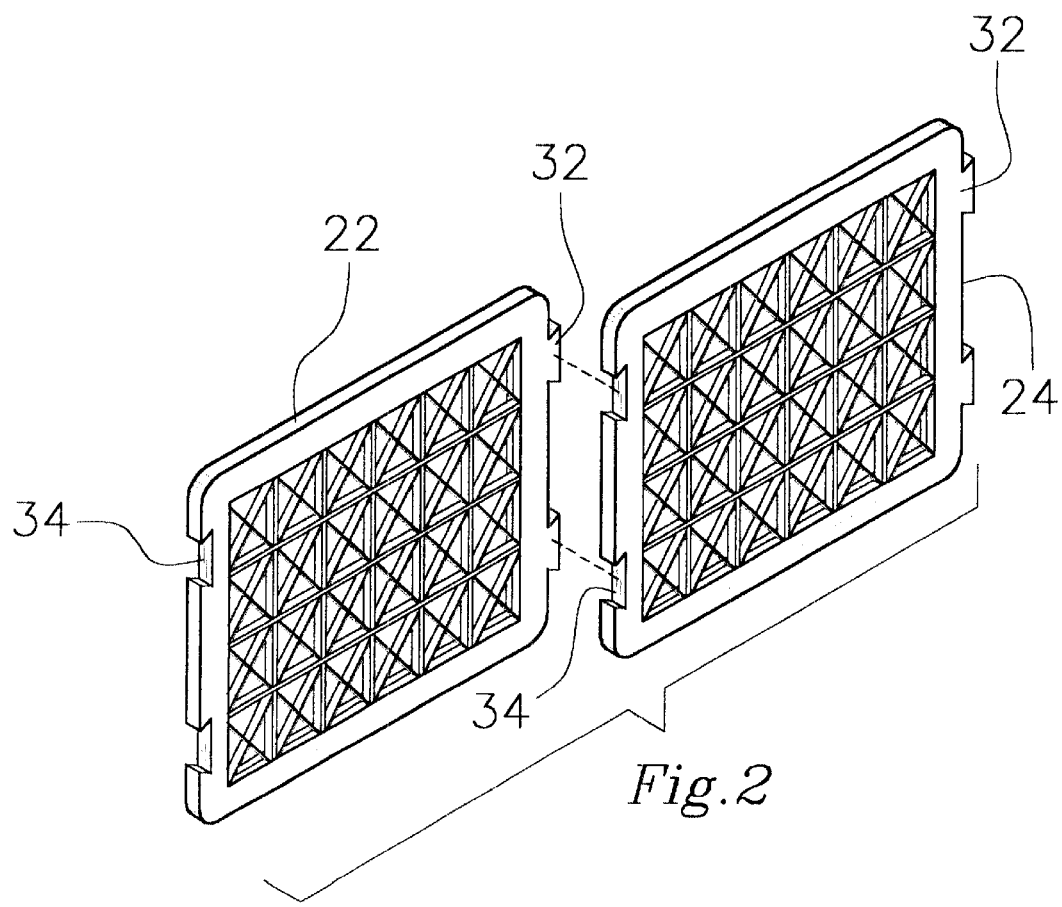
FIG. 2 is a schematic view of the present invention detailing the connector system.

With reference now to the drawings, and in particular to FIGS. 1 through 5 thereof, a new device for protecting furniture from pet damage embodying the principles and concepts of the present invention and generally designated by the reference numeral 10 will be described.

As best illustrated in FIGS. 1 through 5, the device for protecting furniture from pet damage 10 generally comprises a plurality of protective panels 20 (including side edges 22, end edges 24, faces 26, and a connector system 30) and an anchoring panel 60 including an anchor edge 62 and T-shaped protrusions 64.

One type of furniture 2 highly suitable for use with the invention 10 has a base 4 and a cushion 6 with a slot 8 being formed between the two. Common illustrative examples of this type of furniture include sofas and upholstered chairs.

The furniture protection system comprises a plurality of protective panels 20 and an anchoring panel 60.

The protective panels 20 each have a pair of opposite faces 26, a pair of end edges 24, a pair of side edges 22, and a connector system 30. The end edges 24 are relatively shorter than the side edges 22. The end edges 24 and side edges 22 when taken together form a generally rectangular shape.

The connector system 30 of each protective panel 20 allows the protective panels 20 to be connected together. The connector system 30 is comprised of a first connector structure 32 and a second connector structure 34.

The first connector structure 32 is located on one of the end edges 24, and comprises at least one protrusion. The second connector structure 34 is located on the opposite end edge 24, and comprises at least one recess.

In an illustrative embodiment (FIG. 2), the first connector structure 32 consists of a pair of protrusions, which are generally trapezoidal in shape. The narrower portion of each of the trapezoidal shapes is positioned closest to the end edge 24, and the wider portions of each of the trapezoidal shapes is positioned away from the end edge 24. The second connector structure 34 consists of a pair of recesses also generally trapezoidal in shape. The narrower portion of each of the recesses is positioned at the end edge 24 of the protective panel 20, and the wider portion is positioned interiorly of the end edge 24 of the protective panel 20.

Figure 3:
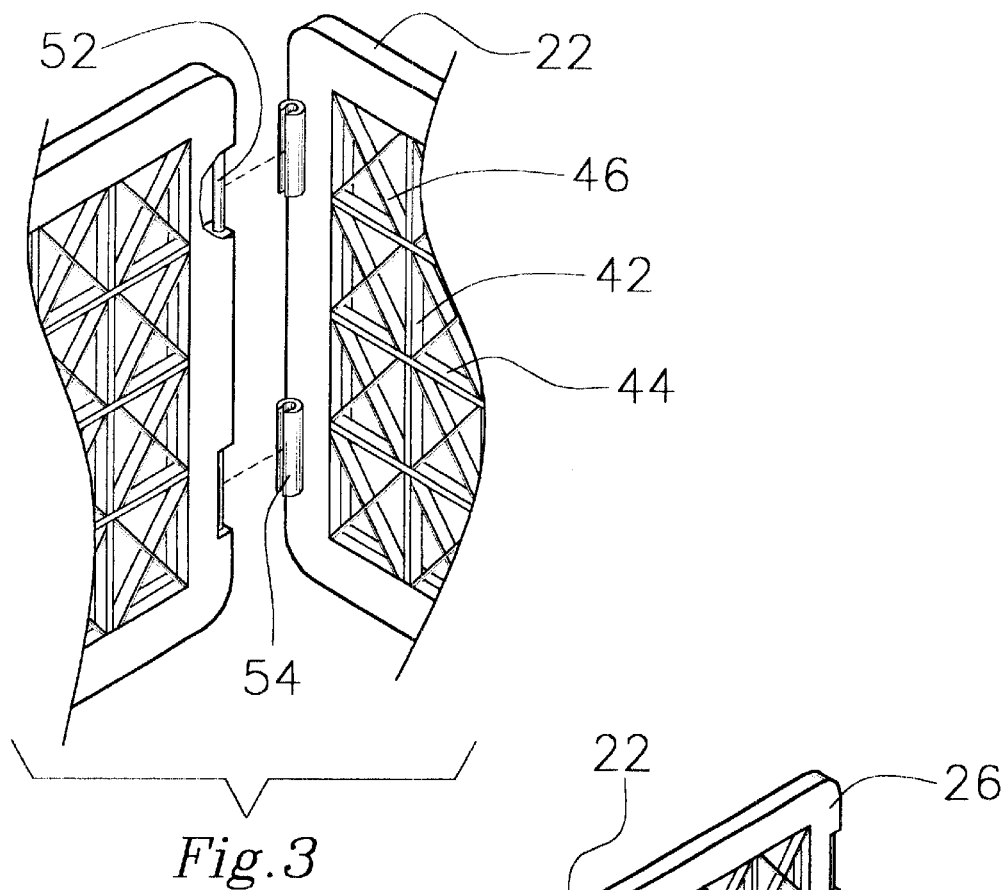
FIG. 3 is a detail schematic view of corner connector system in an embodiment of the present invention.

In an embodiment, the protective panels 20 comprise a perimeter frame with an opening. A plurality of longitudinal members 42 and lateral members 44 extend across the opening, forming a grid with a plurality of apertures. An X-shaped member 46 is situated in each of the apertures (FIG. 3).

In an embodiment having optional features (FIG. 3), two of the plurality of protective panels 20 include a corner connector system 50. The corner connector system 50 comprises a pair of channel members 54 mounted on one of the faces 26 of the first of the two protective panels 20. A pair of rod members 52, designed to be removably received by the channel members 54, are mounted on an end edge 24 of the second of the two protective panels 20.

Figure 4:
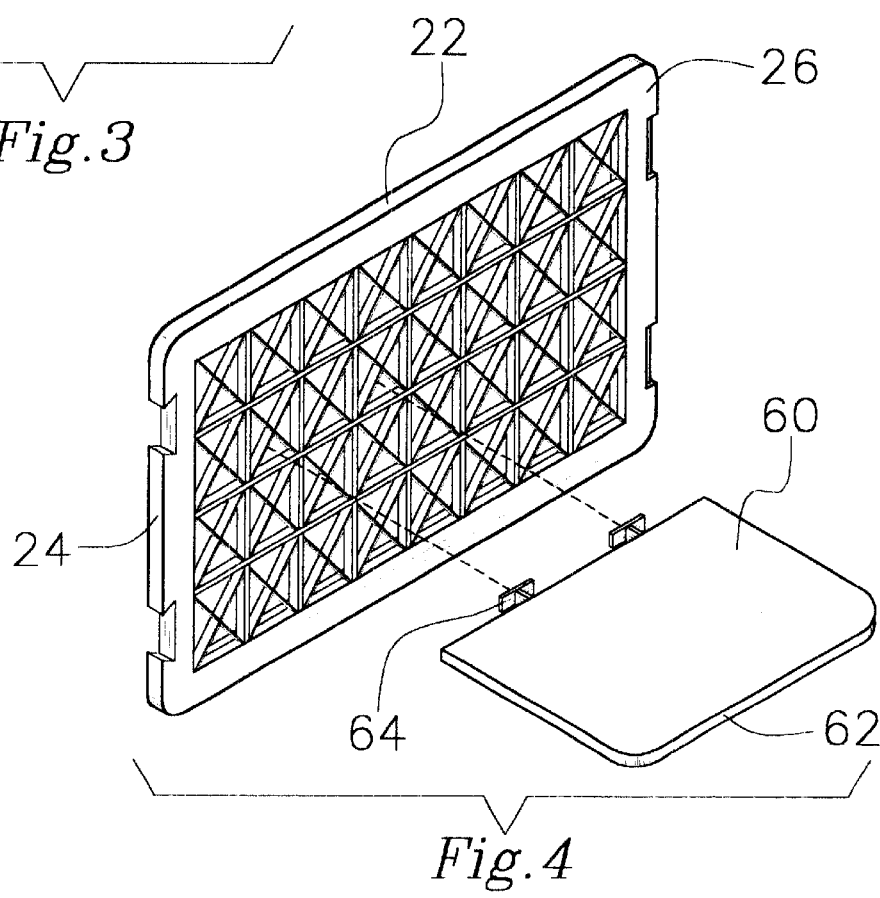
FIG. 4 is a schematic view detailing the anchoring panel of the present invention.
Figure 5:
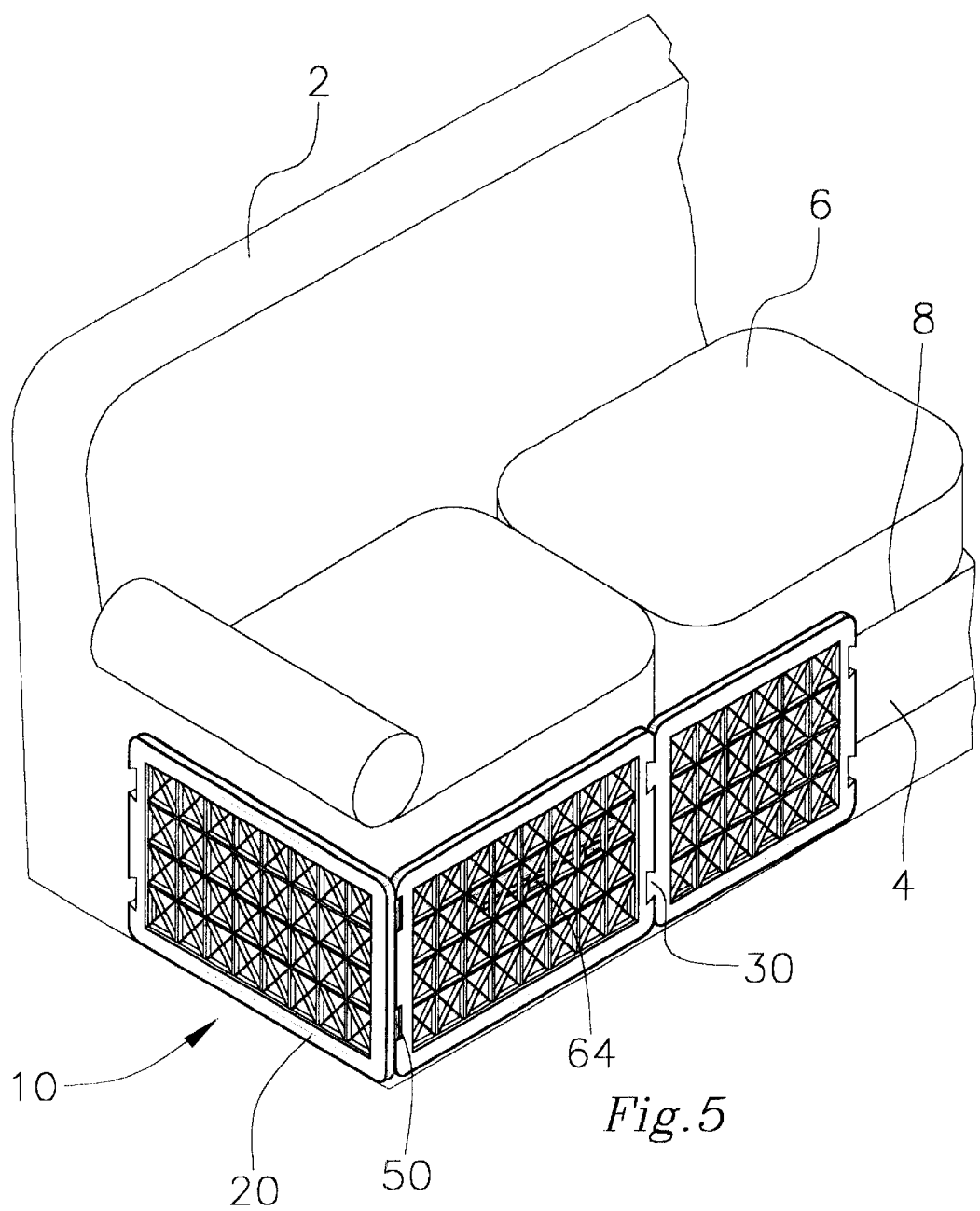
FIG. 5 is a schematic view illustrating the use of an embodiment of the present invention.

The anchoring panel 60 is used to anchor one of the protective panels 20 in a position adjacent to the furniture to be protected. The anchoring panel 60 is positionable between a cushion and the base of the furniture. The anchoring panel 60 has an anchor edge 62, and a pair of T-shaped protrusions 64 (FIG. 4). Each of the protrusions extends from the anchor edge 62 for inserting between and engaging portions of on of the X-shaped members 46 of the protective panels 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A furniture protection system for protecting furniture from damage by pets, the system comprising:

a plurality of protective panels for positioning adjacent to side surface of the furniture, each of the protective panels having a pair of side edges and a pair of end edges, and a pair of opposite faces, each of the protective panels having a connector system for connecting the protective panels together;

wherein each of the protective panels comprises a perimeter frame having an opening, a plurality of longitudinal members and lateral members extending across the opening to form a grid with a plurality of apertures.

2. The furniture protection system of claim 1 wherein the connector system comprises a first connector structure and a second connector structure adapted to releasably interconnect together, the first connector structure being located on a first one of the end edges and the second connector structure being located on a second one of the end edges.

3. The furniture protection system of claim 2 wherein the first connector structure comprises at least one protrusion protruding from one of the end edges of the protective panel and the second connector structure comprises at least one recess in one of the end edges of the protective panels.

4. The furniture protection system of claim 3 wherein the first connector structure comprises a pair of protrusions and the second connector structure comprises a pair of recesses.

5. The furniture protection system of claim 1 additionally comprising an anchoring panel for anchoring one of the protective panels in a position adjacent to a furniture item, the anchoring panel being positionable between the cushion and the base of the furniture item to hold the protective panel against the furniture item.

6. The furniture protection system of claim 5, wherein the anchoring panel has an anchor edge, and a pair of T-shaped protrusions each extending from the anchor edge for inserting between and engaging portions of the protective panels for supporting the anchor panel in a perpendicular orientation to the protective panel.

7. The furniture protection system of claim 1 wherein two of the plurality of protective panels include a corner connector system.

8. The furniture protection system of claim 1 wherein each of the apertures has an X-shaped member situated therein.

9. A furniture protection system for protecting furniture from damage by pets, the system comprising:

a plurality of protective panels for positioning adjacent to side surface of the furniture, each of the protective panels having a pair of side edges and a pair of end edges, and a pair of opposite faces, each of the protective panels having a connector system for connecting the protective panels together;

wherein two of the plurality of protective panels include a corner connector system;

wherein the corner connecting system comprises a pair of channel members mounted on one of the faces of a first one of the two protective panels, and a pair of rod members mounted on and end edge of a second of the two protective panels, the rod members being adapted to be removably received by the channel members.

10. The furniture protection system of claim 9 wherein the connector system comprises a first connector structure and a second connector structure adapted to releasably interconnect together, the first connector structure being located on a first one of the end edges and the second connector structure being located on a second one of the end edges.

11. The furniture protection system of claim 10 wherein the first connector structure comprises at least one protrusion protruding from one of the end edges of the protective panel and the second connector structure comprises at least one recess in one of the end edges of the protective panels.

12. The furniture protection system of claim 11 wherein the first connector structure comprises a pair of protrusions and the second connector structure comprises a pair of recesses.

13. The furniture protection system of claim 9 wherein each of the protective panels comprises a perimeter frame having an opening, a plurality of longitudinal members and lateral members extending across the opening to form a grid with a plurality of apertures.

14. The furniture protection system of claim 9 additionally comprising an anchoring panel for anchoring one of the protective panels in a position adjacent to a furniture item, the anchoring panel being positionable between the cushion and the base of the furniture item to hold the protective panel against the furniture item.

15. The furniture protection system of claim 14 wherein the anchoring panel has an anchor edge, and a pair of T-shaped protrusions each extending from the anchor edge for inserting between and engaging portions of the protective panels for supporting the anchor panel in a perpendicular orientation to the protective panel.

16. A furniture protection system for protecting furniture from damage by pets, the system comprising:

a plurality of protective panels for positioning adjacent to side surface of the furniture, each of the protective panels having a pair of side edges and a pair of end edges, and a pair of opposite faces, each of the protective panels having a connector system for connecting the protective panels together;

wherein the connector system comprises a first connector structure and a second connector structure adapted to releasably interconnect together, the first connector structure being located on a first one of the end edges and the second connector structure being located on a second one of the end edges;

wherein the first connector structure comprises at least one protrusion protruding from one of the end edges of the protective panel and the second connector structure comprises at least one recess in one of the end edges of the protective panels;

wherein the protrusion has a generally trapezoidal shape, a narrower portion of the trapezoidal shape being positioned closest to the end edge and a wider portion of the trapezoidal shape being positioned away from the end edge.

17. The furniture protection system of claim 16 wherein the recess has a generally trapezoidal shape, a narrower portion of the recess being positioned at the end edge of the protective panel and a wider portion of the recess being positioned interiorly of the end edge of the protective panel.

* * * * *